(12) United States Patent
Alaze et al.

(10) Patent No.: US 6,616,420 B2
(45) Date of Patent: Sep. 9, 2003

(54) RECIPROCATING PISTON PUMP WITH AUXILIARY SUPPORT SHAFT

(75) Inventors: Norbert Alaze, Markgroeningen (DE); Wolfgang Schuller, Sachsenheim (DE); Erwin Sinnl, Meimsheim (DE)

(73) Assignee: Robert Bosch GmbH, Stutttgart (DE)

( * ) Notice: Subject to any disclaimer, the term of this patent is extended or adjusted under 35 U.S.C. 154(b) by 0 days.

(21) Appl. No.: 10/022,903

(22) Filed: Dec. 20, 2001

(65) Prior Publication Data

US 2002/0090306 A1 Jul. 11, 2002

(30) Foreign Application Priority Data

Dec. 21, 2000 (DE) .......................... 100 63 757

(51) Int. Cl.$^7$ .............................. F04B 1/04; F04B 17/00
(52) U.S. Cl. .................. 417/273; 417/415; 417/359; 417/360; 417/419
(58) Field of Search ................. 417/273, 415, 417/359, 360, 470, 471, 419; 92/72

(56) References Cited

U.S. PATENT DOCUMENTS

| 4,573,882 A | * | 3/1986 | Watanabe et al. ............ 417/366 |
| 5,004,406 A | * | 4/1991 | Kuroyanagi et al. ......... 417/273 |
| 5,281,013 A | * | 1/1994 | Pichon et al. ............. 303/116.4 |
| 5,895,207 A | * | 4/1999 | Burgdorf et al. ......... 417/410.1 |
| 6,158,326 A | * | 12/2000 | Burgdorf et al. ............... 92/72 |

* cited by examiner

*Primary Examiner*—Charles G. Freay
*Assistant Examiner*—Timothy P. Solak
(74) *Attorney, Agent, or Firm*—Ronald E. Greigg

(57) ABSTRACT

The invention relates to a pump assembly for a hydraulic brake system with traction control, having an electric motor and a piston pump. To reduce a bearing load, the invention proposes rotatably supporting and thereby radially bracing a motor shaft, or an eccentric sleeve pressed onto the motor shaft, on both sides of pump pistons. To economize on installation space, a pump bearing is disposed in an end of the eccentric sleeve that protrudes past the motor shaft.

8 Claims, 1 Drawing Sheet

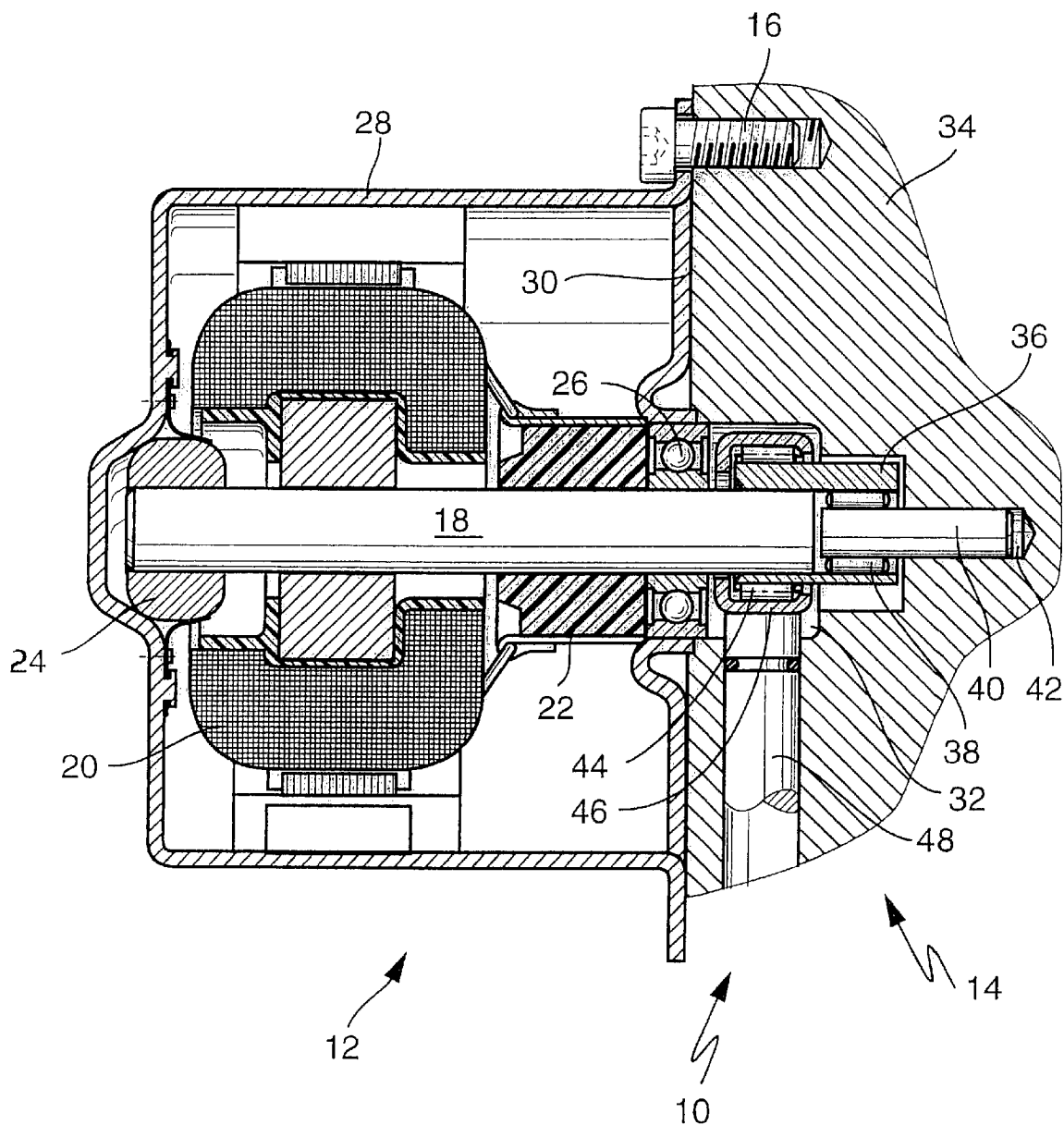

RECIPROCATING PISTON PUMP WITH AUXILIARY SUPPORT SHAFT

BACKGROUND OF THE INVENTION

1. Field of the Invention

The invention relates to an improved pump assembly for a hydraulic vehicle brake system.

2. Description of the Prior Art

One pump assembly of this type with which this invention is concerned is known from German Patent Disclosure DE 196 32 167 A1. The known pump assembly has an electric motor as well as a piston pump that is drivable with the electric motor. The piston pump has an eccentric sleeve, which by means of a torque-transmitting sleeve is connected in a manner fixed against relative rotation to a motor shaft of the electric motor. The torque-transmitting sleeve forms a rotationally rigid, non-shiftable coupling, which compensates for radial and angular errors of alignment as well as axial displacements between the eccentric sleeve and the motor shaft. By rotational drive of the eccentric sleeve, pump pistons that are disposed radially to the eccentric sleeve in a pump housing are driven to execute a reciprocating stroke motion, by which fluid (brake fluid) is pumped in a manner known per se.

The torque-transmitting sleeve decouples the motor shaft from radial stresses that the pump pistons exert on the eccentric sleeve; no bending stress is transmitted to the motor shaft. The eccentric sleeve is rotatably supported by a bearing, hereinafter called a pump bearing, that is disposed in the eccentric sleeve and on a pump shaft that is mounted solidly in the pump housing and protrudes into the eccentric sleeve. The pump bearing braces the eccentric sleeve against radial stresses that the pump pistons exert on the eccentric sleeve. The pump bearing of the known pump assembly is located in a radial plane with the pump pistons disposed radially to the eccentric sleeve. Since no bending stress is transmitted to the motor shaft, the radial stresses must be intercepted solely by the pump shaft, which is braced on only one side in the pump housing. Accordingly, the pump shaft experiences major bending stress and force distribution is unfavorable.

OBJECT AND SUMMARY OF THE INVENTION

In the pump assembly of the invention, the eccentric sleeve is rigidly pressed onto the motor shaft and in this way rigidly joined to the motor shaft. A motor bearing near the pump and the pump bearing, that is, the two bearings that brace the eccentric sleeve against the radial stresses of the pump pistons, are furthermore disposed on both sides of an engagement point of the pump pistons on the eccentric sleeve. Radial stresses exerted on the eccentric sleeve by the pump pistons are thereby distributed to the pump bearing and the motor bearing near the pump; the bearing load on the individual bearing is thus reduced. The bearings can accordingly be made smaller, which economizes on installation space. Another advantage of the invention is that the pump shaft, which is mounted in the pump housing and on which the eccentric sleeve is rotatably supported, is not subjected to bending stress by the pump pistons, since the eccentric sleeve is radially braced via the motor bearing near the pump. Pressing the eccentric sleeve onto the motor shaft produces a favorable distribution and transmission of force and moment within the motor shaft and the eccentric sleeve. The component formed of the motor shaft with the eccentric sleeve pressed onto it can be considered, in terms of force and moment distribution, as a one-piece component.

The pump bearing of the invention makes it possible to use a stepless motor shaft which can thus be produced economically. Another advantage of the invention is that the motor shaft and the eccentric sleeve can be produced with high precision and low tolerance, which makes a small bearing plate possible, which in turn reduces noise.

According to one embodiment, the motor bearing near the pump is mounted in a motor housing of the electric motor. This includes the possibility that a motor bearing near the pump protrudes axially into the pump housing in the manner of a peg connection, and thereby centers the electric motor on the piston pump when the electric motor and the piston pump are put together. Mounting the motor bearing near the pump in the motor housing of the electric motor has the advantage that the electric motor can be tested separately from the piston pump.

In one feature of the invention, it is provided that the motor bearing near the pump be used as a so-called fixed bearing, which takes on the task of axially guiding the motor shaft and eccentric sleeve pressed onto it. To that end, claim 4 provides for the use of a ball bearing for the motor bearing near the pump, the inner and outer ring of the ball bearing being axially fixed.

The two other bearings, namely the pump bearing and the eccentric bearing, are provided in the form of so-called loose bearings, which do not axially guide the motor shaft. For the sake of a small structural size, these two bearings may be embodied as needle bearings.

The pump assembly of the invention is intended in particular as a pump in a brake system of a vehicle and is used to control the pressure in wheel brake cylinders. Depending on the type of brake system, the abbreviations ABS (for anti-lock brake system), TCS (traction control system), VDC (vehicle dynamics control) and EHB (electrohydraulic brake system) are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or VDC or EHB). In a brake system with wheel slip control (ABS or TCS) and/or a brake system serving as a steering aid (VDC) and/or an electrohydraulic brake system (EHB), the pump is needed. With the wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (VDC), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

BRIEF DESCRIPTION OF DRAWINGS

The invention will be better understood and further objects and advantages thereof will become more apparent from the ensuing detailed description of a preferred embodiment taken in conjunction with the single drawing.

DESCRIPTION OF THE PREFERRED EMBODIMENT

The pump assembly of the invention, shown in the drawing and identified overall by reference numeral 10, has an electric motor 12 and a piston pump 14. The electric motor 12 and the piston pump 14 are screwed together by means of screws 16, only one of which is visible in the drawing. The electric motor 12 has a motor shaft 18, which in the exemplary embodiment of the invention shown here is embodied as a stepless solid shaft. Stepless means that the motor shaft 18 has the same diameter over its entire length. The motor shaft 18 can thus be produced inexpensively and with high precision or in other words low tolerance and can be cut apart from rod material.

Armature windings 20 and a commutator 22 are mounted on the motor shaft 18. The motor shaft 18 is rotatably supported by a motor bearing 24 remote from the pump and a motor bearing 26 near the pump. The motor bearing 24 remote from the pump is a slide bearing of a porous sintered metal, which is saturated with a bearing oil for permanent lubrication. The motor bearing 24 remote from the pump is mounted on the bottom of a cup-shaped motor housing 28 of the electric motor 12.

The motor bearing 26 near the pump is embodied as a ball bearing in the exemplary embodiment shown of the invention and is inserted into a bearing plate 30, which forms a cap for the motor housing 28 and closes off the cup-shaped motor housing 28 on its open face end. Because the motor shaft 18 is supported independently of the pump housing 34 in the motor housing 28 and the bearing plate 30 that belongs to the motor housing 28, the electric motor 12 is testable independently of the piston pump 14.

The motor bearing 26 near the pump protrudes axially from the bearing plate 30 and in the manner of a peg connection engages a cylindrical eccentric chamber 32, which is formed in a pump housing 34 of the piston pump 14. The motor bearing 26 near the pump, engaging the eccentric chamber 32, centers the electric motor 12 on the piston pump 14; that is, the motor bearing 26 near the pump aligns the electric motor 12 and the piston pump 14 coaxially with one another.

The pump housing 34 is formed by a hydraulic block of a hydraulic vehicle brake system, not otherwise shown, that has traction control. Besides the piston pump 14, such other hydraulic components as magnet valves, hydraulic reservoirs, and damper chambers of the hydraulic vehicle brake system are accommodated in the hydraulic block forming the pump housing 34 and interconnected hydraulically with one another and with the piston pump 14. The drawing shows only a fraction of the hydraulic block in the region of the piston pump 14. The electric motor 12 is screwed to the hydraulic block that forms the pump housing 34.

The motor shaft 18 protrudes through the motor bearing 26 near the pump into the eccentric chamber 32 in the pump housing 34. An eccentric sleeve 36 is pressed onto the end of the motor shaft 18 located in the eccentric chamber 32, and in this way the eccentric sleeve is rigidly connected to the motor shaft 18. The eccentric sleeve has a cylindrical circumferential surface and a cylindrical through hole; the through hole is mounted parallel and eccentrically to the circumferential surface of the eccentric sleeve 36.

The eccentric sleeve 36 protrudes axially past the motor shaft 18 and is rotatably supported by a pump bearing 38. The pump bearing 38, in the exemplary embodiment shown of the invention, is embodied as a needle bearing and disposed in the part of the eccentric sleeve 36 that protrudes past the motor shaft 18. The pump bearing 38 is received on a pump shaft 40, which is pressed into a bore 42 that is made in the pump housing 34 coaxially to the eccentric chamber 32. The pump shaft 40 is disposed coaxially to the motor shaft 18; it protrudes into the part of the eccentric sleeve 36 that protrudes past the motor shaft 18. The eccentric sleeve 36 is supported rotatably by the pump bearing 38 on the pump shaft 40, which is fixed in the pump housing 34.

In the region of the eccentric sleeve 36 that is pressed onto the motor shaft 18, an eccentric bearing 44 is mounted, which in the exemplary embodiment of the invention shown and described here is embodied as a needle bearing. The eccentric bearing 44 is disposed axially between the motor bearing 26 near the pump and the pump bearing 38. At least one pump piston 48 of the piston pump 14 rests with its face end on a bearing ring 46 of the eccentric bearing 44. The pump assembly preferably has a plurality of pump pistons 48, in particular two of them. If the piston pump 14 has two pump pistons 48, then these pump pistons are preferably disposed in a so-called boxer arrangement radially to the motor shaft 18 and facing one another. The pump pistons 48 are embodied by piston restoring springs, not visible in the drawing, which are embodied as helical compression springs and are disposed, being kept in contact with the bearing ring 46 of the eccentric bearing 44, on a face end of the pump pistons 48 that is remote from the eccentric sleeve 36. When the electric motor 12 drives the eccentric sleeve 36 to rotate, the pump pistons 48 are driven to a reciprocating stroke motion and in the process pump fluid in the manner known per se from piston pumps. When the pump assembly 10 is used in a hydraulic vehicle brake system, the fluid pumped is brake fluid. The two pump pistons 48 are disposed in a so-called boxer arrangement, facing another on two sides of the eccentric sleeve 36. The section shown in the drawing through the pump assembly 10 is angled along a imaginary motor and pump shaft axis, so that in the lower half of the drawing, one of the two pump pistons 48 is visible, while in the upper half, one of the screws 16 is visible.

The eccentric sleeve 36 is rotatably supported on one side of the eccentric bearing 44 by the pump bearing 38. The pump bearing 38 is disposed in the eccentric sleeve 36 on a side, viewed in the axial direction, of the eccentric bearing 44 that is remote from the electric motor 12. The pump pistons 48 are located between the pump bearing 38 and the electric motor 12. With the motor bearing 26 near the pump, the eccentric sleeve 36 is supported indirectly via the motor shaft 18, onto which the eccentric sleeve 36 is pressed, rotatably on another side of the eccentric bearing 44 and of the pump pistons 48. The pump bearing 38 and the motor bearing 26 near the pump brace the eccentric sleeve 36 in the radial direction on both sides of the eccentric bearing 44 and the pump pistons 48. Radial forces exerted on the eccentric sleeve 36 by the pump pistons 48, especially while brake fluid is being pumped, are distributed to the pump bearing 38 and the motor bearing 26 near the pump. The load on the individual bearing is less as a result, and thus the pump bearing 38 and/or the motor bearing 26 near the pump can be made smaller. As a result, installation space can be saved, especially in the pump housing 34. Because of the indirect support of the eccentric sleeve 36 via the motor shaft 18 by the motor bearing 26 near the pump on the side of the eccentric bearing 44 and of the pump pistons 48 remote from the pump shaft 40, a bending stress on the pump shaft 40 is avoided. This too makes it possible to reduce the diameter and installation space. Because the eccentric sleeve 36 and the motor shaft 18 are braced on both sides of the eccentric bearing 44 and the pump pistons 48 by the motor bearing 26 near the pump and by the pump bearing 38, a bending stress on the motor shaft 18 from the pump pistons 48 is reduced to a minimum. Because the eccentric sleeve 36 is pressed onto the motor shaft 18, these two components can be considered, in terms of the effective force and moment distribution and transmission in them as a one-piece component. The construction according to the invention of the pump assembly 10 makes high dimensional precision with low tolerances possible, especially in the region of the motor shaft 18, eccentric sleeve 36 and pump shaft 40, and small bearing plays can be attained, especially of the eccentric bearing 44 and pump bearing 38 that are embodied as needle bearings, which is a prerequisite for quiet operation of the pump assembly 10. The motor shaft 18, in particular, has high dimensional precision since it makes do without any graduation of diameter.

The foregoing relates to a preferred exemplary embodiment of the invention, it being understood that other variants and embodiments thereof are possible within the spirit and scope of the invention, the latter being defined by the appended claims.

We claim:

1. A pump assembly for a hydraulic vehicle brake system, having an electric motor and having a piston pump driven by the electric motor, the electric motor having a motor shaft that is supported rotatably, on a side toward the piston pump, by a motor bearing near the pump, and the piston pump has an eccentric sleeve which is fixed against relative rotation to the motor shaft of the electric motor and protrudes axially past the motor shaft and by rotation drives a pump piston of the piston pump to execute a reciprocating motion, and the eccentric sleeve is supported rotatably by a pump bearing, on a pump shaft that is mounted in a pump housing and protrudes into the eccentric sleeve, characterized in that the eccentric sleeve (36) is pressed onto the motor shaft (18), and that the motor bearing (26) near the pump and the pump bearing (38) are disposed axially offset to the pump piston (48), with the motor bearing (26) near the pump disposed on one side of the pump piston (48), and the pump bearing (38) disposed on the other side of the pump piston.

2. The pump assembly according to claim 1, characterized in that the motor bearing (26) near the pump is mounted in a motor housing (28, 30) of the electric motor (12).

3. The pump assembly according to claim 1, characterized in that an eccentric bearing (44) is disposed on the outside of the eccentric sleeve (36) axially between the motor bearing (26) near the pump and the pump bearing (38), and the pump piston (48) rests on the outer circumference of the eccentric bearing.

4. The pump assembly according to claim 1, characterized in that the motor bearing (26) near the pump is a ball bearing.

5. The pump assembly according to claim 1, characterized in that the pump bearing (38) is a roller bearing.

6. The pump assembly according to claim 5, characterized in that the pump bearing (38) is a needle bearing.

7. The pump assembly according to claim 1, characterized in that the eccentric bearing (44) is a roller bearing.

8. The pump assembly according to claim 7, characterized in that the eccentric bearing (44) is a needle bearing.

* * * * *